United States Patent
Vetters et al.

(10) Patent No.: US 11,002,143 B2
(45) Date of Patent: *May 11, 2021

(54) IMPINGEMENT TUBES FOR GAS TURBINE ENGINE ASSEMBLIES WITH CERAMIC MATRIX COMPOSITE COMPONENTS

(71) Applicants: Rolls-Royce North American Technologies Inc., Indianapolis, IN (US); Rolls-Royce plc, London (GB)

(72) Inventors: Daniel K. Vetters, Indianapolis, IN (US); Peter Broadhead, Derby (GB); Steven Hillier, Manchester (GB)

(73) Assignees: Rolls-Royce North American Technologies Inc., Indianapolis, IN (US); Rolls-Royce plc

( * ) Notice: Subject to any disclaimer, the term of this patent is extended or adjusted under 35 U.S.C. 154(b) by 254 days.

This patent is subject to a terminal disclaimer.

(21) Appl. No.: 16/136,866

(22) Filed: Sep. 20, 2018

(65) Prior Publication Data

US 2019/0017400 A1 Jan. 17, 2019

Related U.S. Application Data

(63) Continuation of application No. 14/950,794, filed on Nov. 24, 2015, now Pat. No. 10,100,654.

(51) Int. Cl.
*F01D 25/12* (2006.01)
*F01D 9/06* (2006.01)
*F01D 9/02* (2006.01)
*F01D 11/08* (2006.01)

(52) U.S. Cl.
CPC ............... *F01D 9/06* (2013.01); *F01D 9/02* (2013.01); *F01D 11/08* (2013.01); *F01D 25/12* (2013.01); F05D 2220/32 (2013.01); F05D 2240/11 (2013.01); F05D 2260/201 (2013.01); F05D 2300/6033 (2013.01); Y02T 50/60 (2013.01)

(58) Field of Classification Search
CPC ........ F01D 11/08; F01D 11/125; F01D 11/20; F01D 11/24; F01D 25/12; F01D 25/14; F01D 25/24; F01D 9/02; F01D 9/06; F05D 2220/32; F05D 2240/11; F05D 2240/128; F05D 2260/201
USPC ........................................................ 415/116
See application file for complete search history.

(56) References Cited

U.S. PATENT DOCUMENTS

| | | |
|---|---|---|
| 6,884,026 B2 | 4/2005 | Glynn et al. |
| 7,306,424 B2 | 12/2007 | Romanov et al. |
| 7,641,440 B2 | 1/2010 | Morrison et al. |
| 7,670,108 B2 | 3/2010 | Liang |
| 7,726,936 B2 | 6/2010 | Keller et al. |
| 8,197,210 B1 | 6/2012 | Liang |
| 8,550,778 B2 | 10/2013 | Koyabu et al. |

(Continued)

FOREIGN PATENT DOCUMENTS

| | | |
|---|---|---|
| EP | 1124039 A1 | 8/2001 |
| EP | 2631434 A2 | 8/2013 |

*Primary Examiner* — David Hamaoui
*Assistant Examiner* — Justin A Pruitt
(74) *Attorney, Agent, or Firm* — Barnes & Thornburg LLP (57) ABSTRACT

A turbine shroud adapted for use in a gas turbine engine includes a plurality of metallic carrier segments and a plurality of blade track segments mounted to corresponding metallic carrier segments. Impingement tubes direct cooling air onto the blade track segments to cool the blade track segments when exposed to high temperatures in a gas turbine engine.

20 Claims, 7 Drawing Sheets

(56) References Cited

U.S. PATENT DOCUMENTS

| | | |
|---|---|---|
| 8,727,704 B2 | 5/2014 | Lee et al. |
| 8,998,565 B2 | 4/2015 | Foster et al. |
| 10,100,654 B2 * | 10/2018 | Vetters .................... F01D 9/02 |
| 2004/0047726 A1 | 3/2004 | Morrison |
| 2005/0129499 A1 | 6/2005 | Morris et al. |
| 2012/0260670 A1 * | 10/2012 | Foster .................... F01D 11/08 |
| | | 60/798 |
| 2013/0011238 A1 | 1/2013 | Liang et al. |
| 2013/0156550 A1 | 6/2013 | Franks et al. |
| 2014/0023490 A1 | 1/2014 | Hillier |

* cited by examiner

# IMPINGEMENT TUBES FOR GAS TURBINE ENGINE ASSEMBLIES WITH CERAMIC MATRIX COMPOSITE COMPONENTS

CROSS REFERENCE TO RELATED APPLICATIONS

This application is a continuation of U.S. patent application Ser. No. 14/950,794, filed 24 Nov. 2018, the disclosure of which is now expressly incorporated herein by reference.

FIELD OF THE DISCLOSURE

The present disclosure relates generally to gas turbine engines, and more specifically to assemblies including ceramic matrix composite components used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds are made up of a number of segments arranged circumferentially adjacent to one another to form a ring. Such shrouds are sometimes positioned in a turbine section of the engine. Thus, the shrouds contact high temperature products discharged from the combustor and may require cooling.

SUMMARY

An assembly adapted for use in a gas turbine engine is disclosed. The assembly, illustratively a turbine shroud, may include metallic carrier components, ceramic matrix composite supported components, and impingement tubes for carrying cooling air in the assembly. In the non-limiting example provided, the carrier component is provided by carrier segments of the turbine shroud. The supported component is provided by blade track segments made from ceramic matrix composite materials. The impingement tubes are illustratively configured to direct cooling air onto the supported components (the blade track segments) during use of the assembly in a gas turbine engine.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
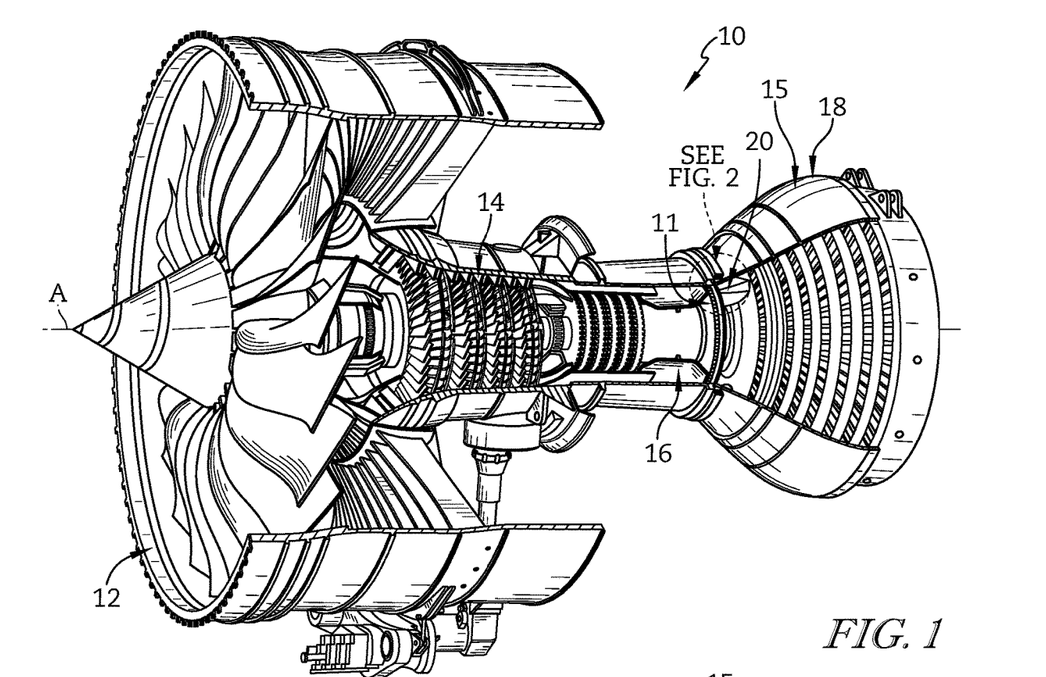
FIG. 1 is a cut-away perspective view of a gas turbine engine showing that the engine includes a fan, a compressor, a combustor, and a turbine, the turbine including a turbine shroud in accordance with the present disclosure positioned radially outward from blades of a turbine wheel assembly as shown in FIGS. 2 and 3.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis A and drive the compressor 14 and the fan 12.

Figure 2:
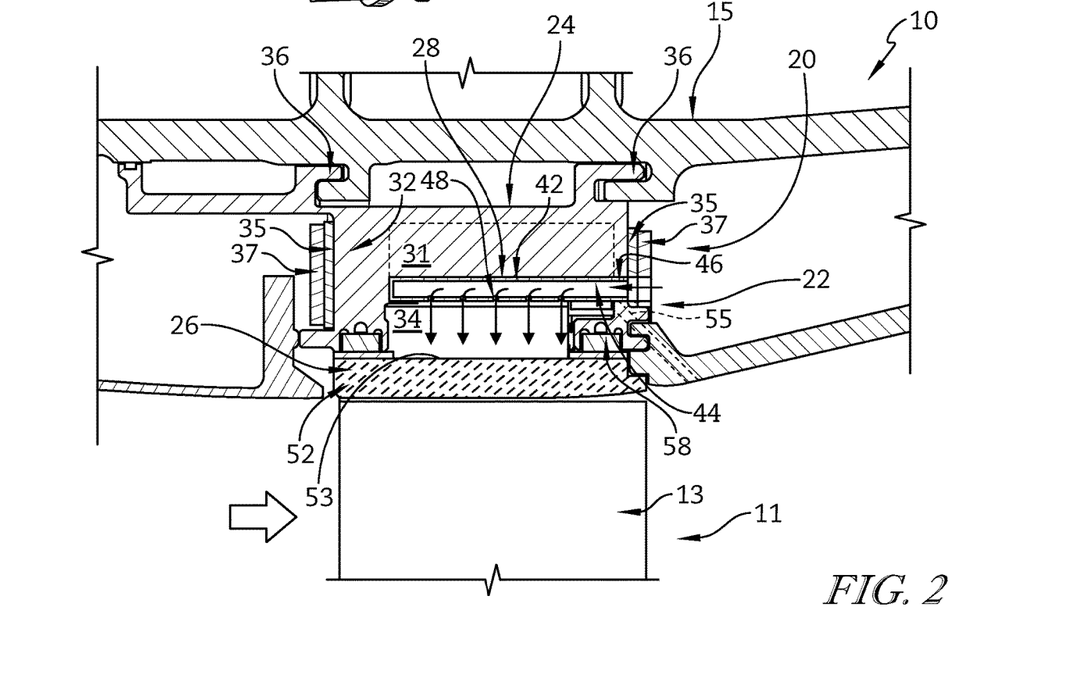
FIG. 2 is a partial sectional view of the gas turbine engine of FIG. 1 showing that the turbine shroud includes a carrier, a blade track coupled to the carrier, and a plurality of impingement tubes extending into the carrier and suggesting that cooling air flows through the impingement tubes and is directed toward the blade track to cool the blade track.

The turbine 18 includes at least one turbine wheel assembly 11 and a turbine shroud 20 positioned to surround the turbine wheel assembly 11 as shown in FIGS. 1 and 2. The turbine shroud 20 is coupled to an outer case 15 of the gas turbine engine 10. The turbine wheel assembly 11 includes a plurality of blades 13 coupled to a rotor disk for rotation therewith. The hot, high pressure combustion products from the combustor 16 are directed toward the blades 13 of the turbine wheel assemblies 11. The blades 13 are in turn pushed by the combustion products to cause the turbine wheel assembly 11 to rotate; thereby, driving the rotating components of the compressor 14 and/or the fan 12.

Figure 3:
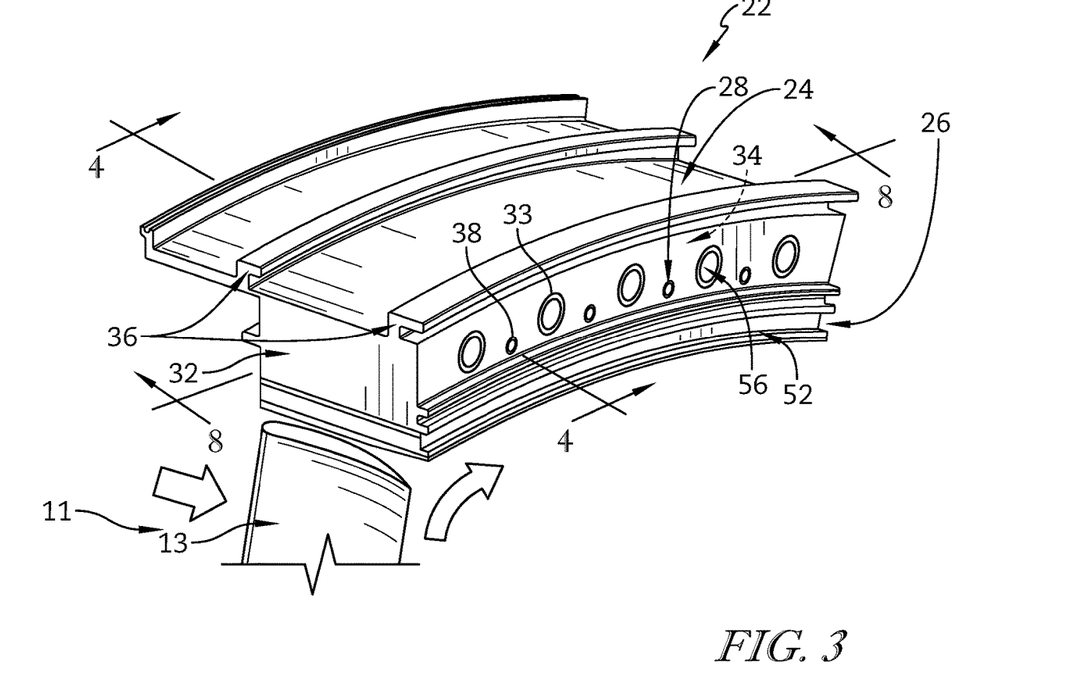
FIG. 3 is a perspective view of a shroud segment of the turbine shroud of FIG. 2 showing that the shroud segment includes a carrier segment, a blade track segment coupled to the carrier segment, and a plurality of impingement tubes coupled to the carrier segment and suggesting that hot gasses pass over the blades of the turbine wheel to rotate the turbine wheel and that the blades pass along the blade track segment as the turbine wheel rotates.

The turbine shroud 20 extends around the turbine wheel assembly 11 to block combustion products from passing over the blades 13 without pushing the blades 13 to rotate as suggested in FIGS. 2 and 3. In the illustrative embodiment, the turbine shroud 20 is made up of a number of shroud segments 22, one of which is shown in FIG. 3, that extend only part-way around the central axis A and cooperate to surround the turbine wheel assembly 11. In other embodiments, the turbine shroud 20 is annular and non-segmented to extend fully around the central axis A and surround the turbine wheel assembly 11. In yet other embodiments, portions of the turbine shroud 20 are segmented while other portions are annular and non-segmented.

Each shroud segment 22 includes a carrier segment 24, a blade track segment 26, and one or more impingement tubes 28 as shown in FIG. 2. The carrier segment 24 is configured to support the blade track segment 26 in position adjacent to the blades 13 of the turbine wheel assembly 11. The blade track segment 26 is generally concentric with and nested into the carrier segment 24 along the central axis A of the gas turbine engine 10. The impingement tubes 28 are coupled to the carrier segment 24 and configured to direct a flow of cooling air toward a radially-outward facing side, hereinafter referred to as a backside 53 of the blade track segment 26.

Figure 4:
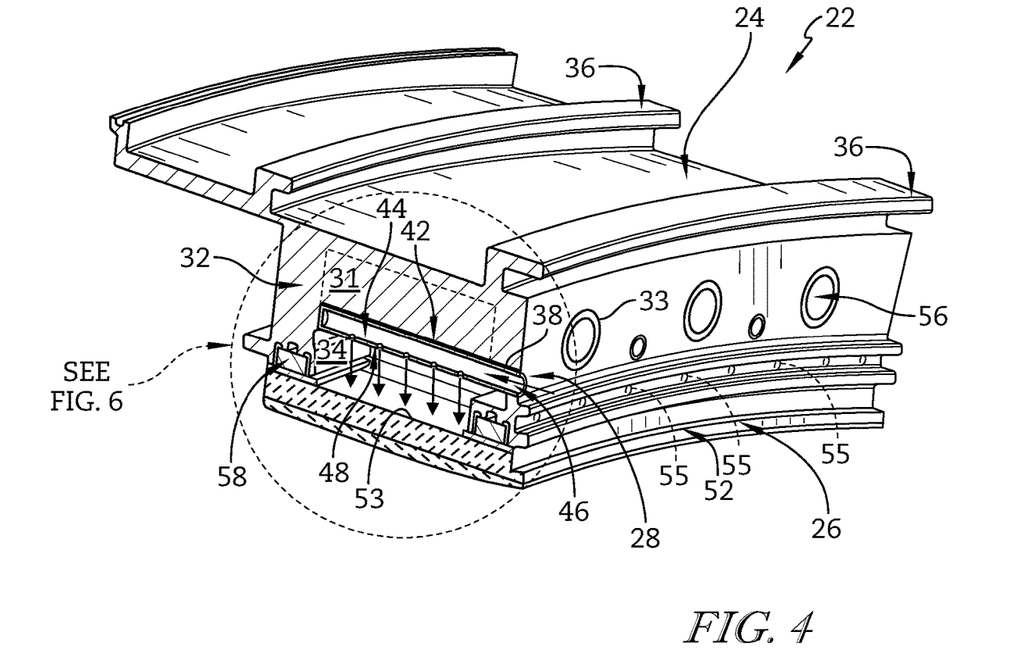
FIG. 4 is a perspective sectional view taken along line 4-4 in FIG. 3 showing the impingement tubes extend axially into the carrier segment and are spaced circumferentially from one another to direct the flow of cooling air along a backside of the blade track segment.
Figure 9:
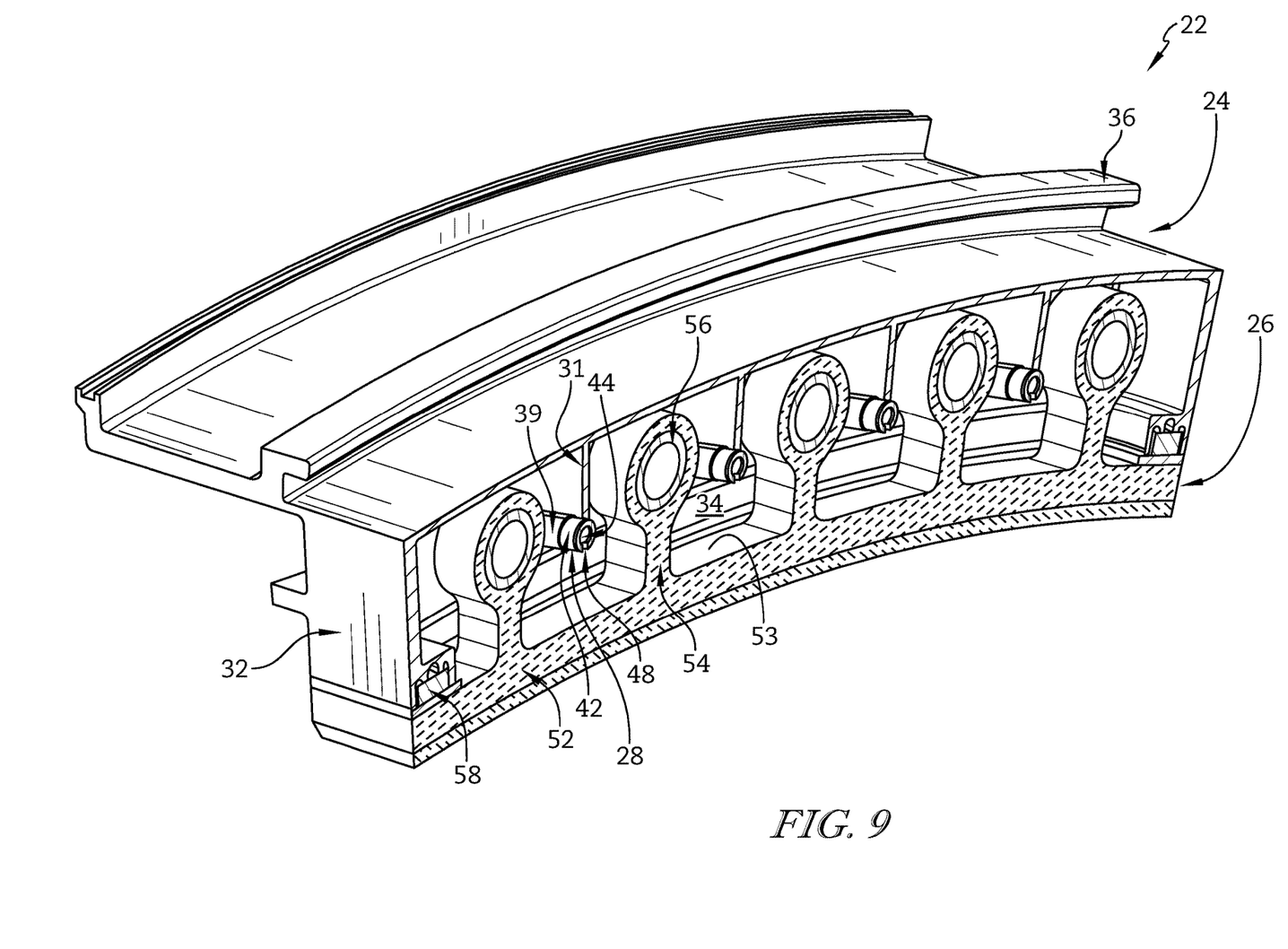
FIG. 9 is a perspective sectional view of the shroud segment of FIG. 8 showing that the attachment posts of the blade track segment divide a cavity within the carrier segment into a plurality of cooling zones and suggesting that an impingement tube is positioned within each cooling zone to cool the blade track segment.

In the illustrative embodiment, each of the carrier segments 24 includes a body 32 formed to define a cavity 34 and case hangers 36 coupled to the body 32 as suggested in FIGS. 4 and 9. The case hangers 36 are spaced apart from one another and couple the carrier segments 24 to the outer case 15 of the engine 10 as shown in FIG. 2. The impingement tubes 28 extend through the body 32 and are configured to pass the flow of cooling air into the cavity 34 as suggested in FIG. 4.

Figure 5:
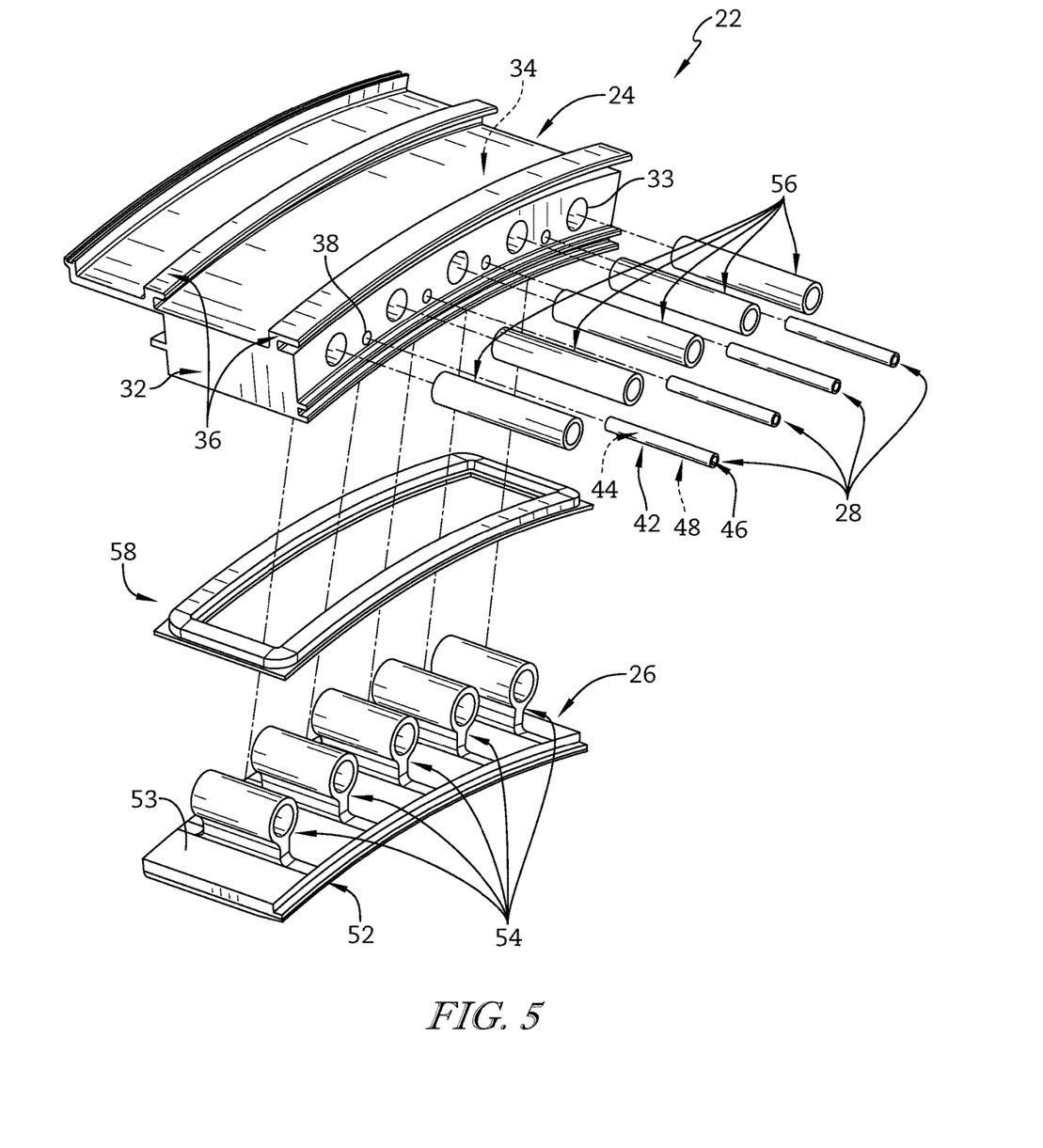
FIG. 5 is an exploded perspective view of a shroud segment of FIG. 3 showing that the blade track segment includes a runner and a plurality of attachment posts extending radially outward from the runner and suggesting that the attachment posts extend into the carrier segment and attachment pins extend into the carrier segment and attachment posts to hold the blade track segment to the carrier segment.

Each blade track segment 26 includes a runner 52 defining the backside 53 and a plurality of attachment posts 54 extending radially outward from the runner 52 as shown in FIG. 5. While five attachment posts 54 are shown, more or less attachment posts may be used to hold the blade track segment 26 to the carrier segment 24. The attachment posts 54 are configured to extend into the cavity 34 of the carrier segment 24 and receive attachment pins 56 to hold the blade track segment 26 to the carrier segment.

In the illustrative embodiment, a seal member 58 is positioned between the backside 53 of the runner and the body 32 of the carrier segment 24 to seal the cavity 34 as suggested in FIG. 5. The seal member 58 creates a continuous seal along a perimeter edge of the runner 52. The attachment pins 56 extend through pin receivers 33 of the carrier segment 24 and through the attachment posts 54 to align the blade track segment 26 with the carrier segment 24 and hold the runner 52 against the seal member 58 as suggested in FIG. 8. The runner 52 is configured to block hot gasses from passing over the blades 13 without interacting with the blades 13 when the shroud segments 22 are coupled to the outer case 15 as suggested in FIG. 2.

Figure 6:
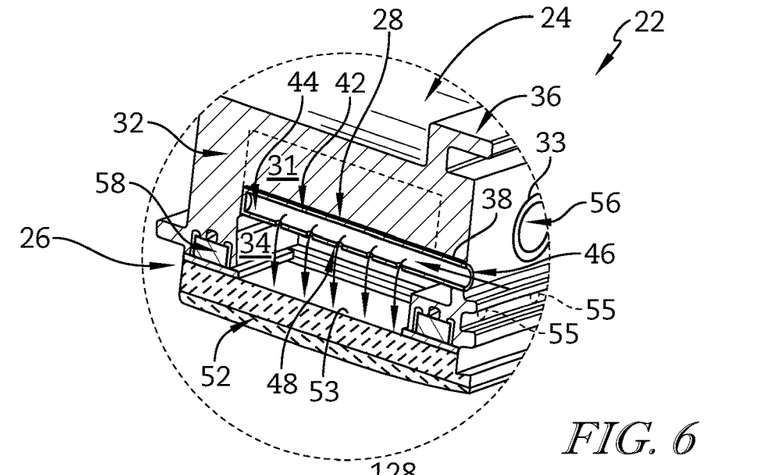
FIG. 6 is an enlarged view of FIG. 4 showing that the impingement tubes each include an elongated body defining a cooling air plenum therein, an opening at one end of the body extending into the cooling air plenum, and a plurality of impingement holes axially spaced along the body and suggesting that the flow of cooling air enters through the opening of the impingement tube and is directed toward the blade track segment by the impingement holes to cool the blade track segment.

Each of the impingement tubes 28 includes an elongated body 42 defining a cooling air plenum 44 therein, an opening 46 at one end of the body 42 extending into the cooling air plenum 44, and a plurality of impingement holes 48 axially spaced along the body 42 as suggested in FIG. 6. The flow of cooling air enters through the opening 46 and is directed toward the blade track segment 26 by the impingement holes 48 to cool the blade track segment 26. In some embodiments, cooling air discharge ports 55 may be formed in the carrier segments 24 along a trailing edge side of the shroud segments 22 to allow the cooling air to escape from the cavity 34 and rejoin a primary gas path through the engine 10. In other embodiments, the discharge ports may be formed through the seal member 58 or the blade track segment 26 along the trailing edge of the shroud segments 22.

In some embodiments, one or more gaskets 35 are coupled to the carrier segment 24 to cover the attachment pins 56 and pin receivers 33 so that the flow of cooling air is blocked from entering the cavity 34 through the pin receivers 33 as suggested in FIG. 2. The gaskets 35 are formed to include openings to allow the flow of cooling air to pass through impingement tubes 28. Cover plates 37 are positioned to hold the gaskets 35 against the carrier segments 24.

Figure 7:
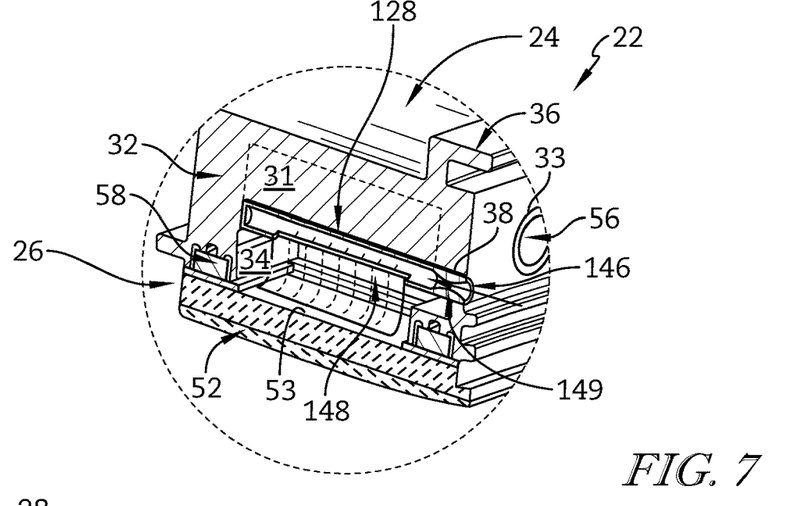
FIG. 7 is a view similar to FIG. 6 showing another embodiment of an impingement tube in accordance with the present disclosure having an elongated body defining a cooling air plenum therein, an opening at one end of the body extending into the cooling air plenum, and an impingement slot extending along the body and suggesting that the flow of cooling air enters through the opening of the impingement tube and is directed toward the blade track segment by the impingement slot to cool the blade track segment.

Another embodiment of an impingement tube 128 in accordance with the present disclosure is shown in FIG. 7. The impingement tube 128 is substantially similar to the impingement tube 28 except that an impingement slot 148 is used in place of the impingement holes 48. The impingement slot 148 directs a cascade of cooling air toward the blade track segment 26 to cool the blade track segment 26. The cascade may minimize thermal gradients across the blade track segment 26 to minimize thermal stresses. In the illustrative embodiment, a metering orifice or constriction 149 is placed adjacent to an opening 146 into impingement tube 128 to control the flow of cooling air through the impingement tube 128. In some embodiments, the metering orifice is separate from the impingement tube 128 and positioned in an upstream portion of the cooling air flow circuit. In some embodiments, a combination of impingement tubes 28, 128 are used in the shroud segments 22.

Figure 8:
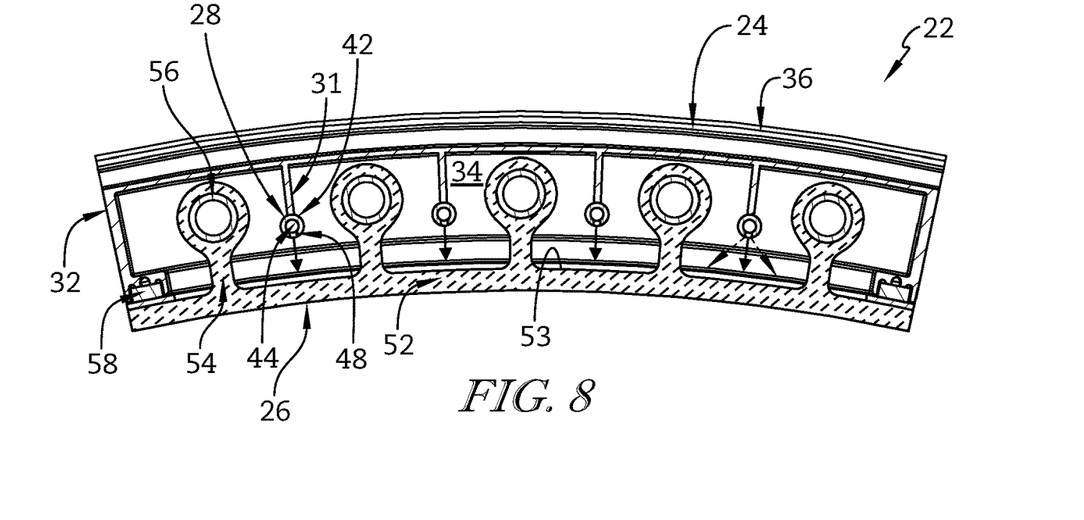
FIG. 8 is a sectional view taken along line 8-8 in FIG. 3 showing that the impingement tubes are positioned between adjacent attachment posts of the blade track segment to allow cooling along the blade track segment.

The attachment posts 54 are spaced apart from one another along the runner of the blade track segment 26 as shown in FIGS. 8 and 9. The impingement tubes 28 are circumferentially spaced from one another and positioned between the attachment posts 54 when the shroud segment 22 is assembled as suggested in FIG. 8. While four impingement tubes 28 are shown, more or less impingement tubes may be used in the shroud segment 22. In some embodiments, additional impingement tubes are positioned between the attachment posts 54 positioned at circumferential ends of the blade track segment 26 and the circumferential end faces of the carrier segment 24.

In the illustrative embodiment, the impingement tubes 28 are configured to direct the flow of cooling air in a radially inward direction toward the runner 52 of the blade track segment 26 as suggested by the solid arrows in FIG. 8. In some embodiments, the impingement tubes 28 are configured to direct the flow of cooling air toward the runner 52 at an angle relative to the radial direction as suggested by the phantom arrows in FIG. 8. In some embodiments, multiple impingement tubes 28 are positioned between adjacent attachment posts 54 of the blade track segment 26.

The impingement tubes 28 extend into the body 32 of the carrier segment 24 through tube receivers 38 as suggested in FIG. 5. The carrier segment 24 further includes tube supports 39 aligned with the tube receivers 38 as suggested in FIG. 9. The tube supports 39 are configured to support a free end of the impingement tubes 28 after the impingement tubes 28 pass through the tube receivers 38. In the illustrative embodiment, opposing ends of the impingement tubes 28 are coupled to the carrier segment 24 while the elongated body 42 is exposed inside the cavity 34. In some embodiments, ribs 31 extend axially across the body 32 and along the impingement tubes 28.

In the illustrative embodiment, there is sufficient space between adjacent attachment posts 54 to allow the impingement tubes 28 to pass between the attachment posts 54 as the blade track segment 26 is being coupled to the carrier segment 24 as suggested in FIGS. 8 and 9. In some embodiments, the attachment posts 54 are closely spaced such that the impingement tubes 28 cannot pass between adjacent attachment posts 54 and would block insertion of the attachment posts 54 into the cavity 34 of the carrier segment 24. In such an embodiment, the blade track segment 26 would be coupled to the carrier segment 24 prior to insertion of the impingement tubes 28 to allow the attachment posts 54 to pass into the cavity 34.

The blade track segments 26 are illustratively formed from ceramic-containing materials as suggested in FIG. 2. In some embodiments, the blade track segments 26 are formed from ceramic-matrix composite materials. The carrier segments 24 and impingement tubes 28 are illustratively formed from metallic materials. The attachment pins 56 are illustratively formed from metallic materials. In some embodiments, the attachment pins 56 are formed from ceramic-containing materials, such as ceramic-matrix composite materials for example.

Figure 10:
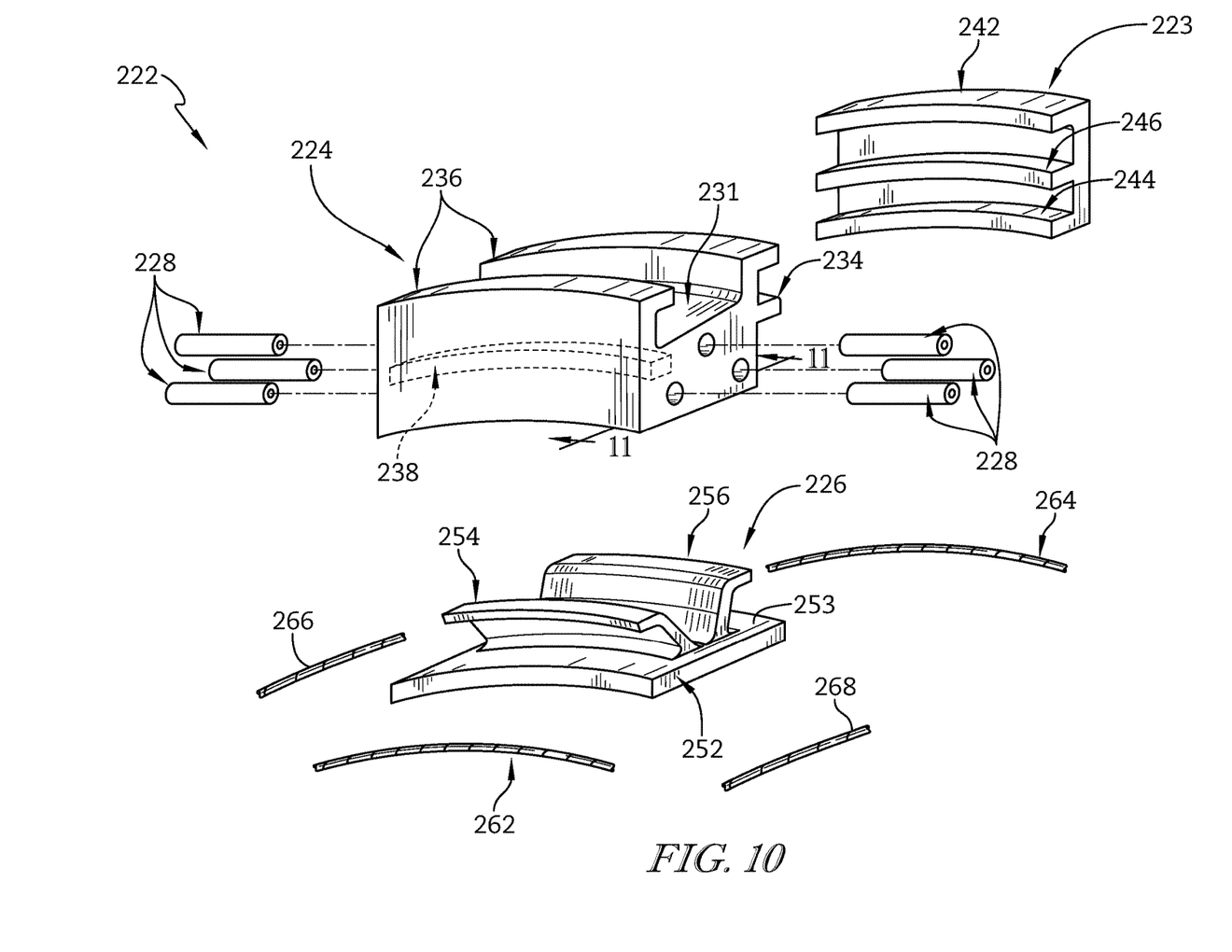
FIG. 10 is an exploded assembly view of another embodiment of a turbine shroud segment in accordance with the present disclosure showing that the shroud segment includes a carrier segment, a retainer segment, a blade track segment coupled between the carrier segment and retainer segment and a plurality of impingement tubes extending circumferentially into the carrier segment.

Another embodiment of a turbine shroud segment 222 in accordance with the present disclosure for use in a turbine shroud of the gas turbine engine 10 is shown in FIG. 10. Each shroud segment 222 includes a retainer segment 223, a carrier segment 224, a blade track segment 226, and a plurality of impingement tubes 228. The carrier segment 224 is configured to support the blade track segment 226 in position adjacent to the blades 13 of the turbine wheel assembly 11 of the gas turbine engine 10. The blade track segment 226 is generally concentric with and nested into the carrier segment 224 along the central axis A of the gas turbine engine 10. The retainer segment 223 engages both the carrier segment 224 and the blade track segment 226 to form the shroud segment 222.

In the illustrative embodiment, each of the carrier segments 224 includes case hangers 236, a retainer bracket 234, and a forward bracket 238 as shown in FIG. 10. The case hangers 236 are spaced apart from one another and connected by a web 231. The case hangers 236 couple the carrier segments 224 to the outer case 15. The retainer bracket 234 is illustratively coupled to the web 231 and positioned to engage the retainer segments 223 to couple the retainer segments 223 with the carrier segments 224. The forward bracket 238 is positioned to engage with a forward hanger 254 of the blade track segments 226.

Each retainer segment 223 includes a hanger 242, an aft bracket 246 coupled to the hanger 242, and an inner wall 244 coupled to the aft bracket 246 as shown in FIG. 10. The hanger 242 engages with the retainer bracket 234 of the carrier segments 224 to couple the retainer segments 223 with the carrier segments 224. The aft bracket 246 is positioned to engage with an aft hanger 256 of the blade track segments 226.

Each blade track segment 226 includes a runner 252, the forward hanger 254 coupled to the runner 252, and the aft hanger 256 coupled to the runner 252 as shown in FIG. 10. The forward and aft hangers 254, 256 extend outward from the runner 252 in a radial direction and away from one another. The runner 252 is configured to block hot gasses from passing over the blades 13 without interacting with the blades 13 when the shroud segments 222 are coupled to the outer case 15 as suggested in FIG. 11.

Figure 11:
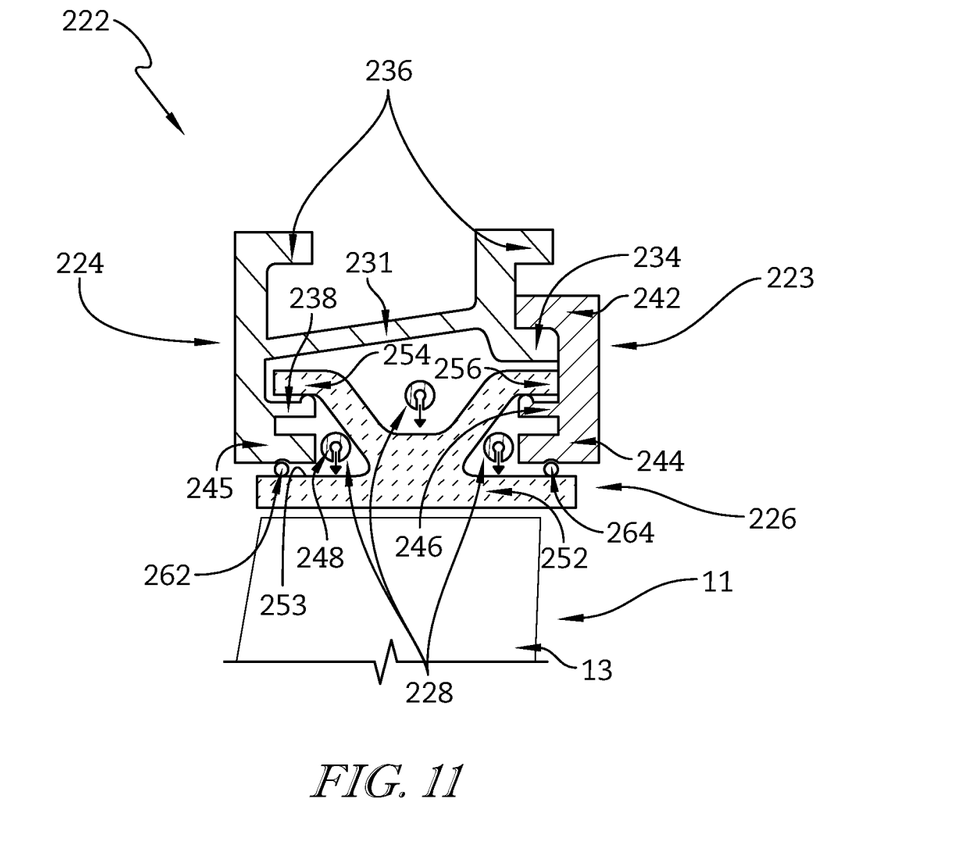
FIG. 11 is a partial sectional view taken along line 11-11 in FIG. 10 showing the impingement tubes positioned along a backside of the blade track segment and suggesting that the impingement tubes direct a flow of cooling air towards the blade track segment to cool the blade track segment.

Circumferential seal elements 262, 264 extend circumferentially along forward and aft sides of each shroud segment 222 as suggested in FIG. 10. The seal elements 262, 264 are illustratively rope seals. The seal elements 264 are arranged radially between the inner wall 244 of the retainer segments 223 and the blade track segments 226 as shown in FIG. 11. The seal elements 264 are arranged radially between an inner wall 245 of the carrier segments 224 and the blade track segments 226. Axial seal elements 266, 268 are arranged between the carrier segment 224 and blade track segment 226 along opposing circumferentially spaced sides thereof. The seal elements 262, 264, 266, 268 block gasses from passing through radial interfaces of components included in the shroud segments 222. In other embodiments, other types of seals may be used.

During assembly, the forward hangers 254 of the blade track segments 226 are engaged with the forward brackets 238 of the carrier segments 224 as suggested in FIGS. 10 and 11. The hangers 242 of the retainer segments 223 are engaged with the retainer brackets 234 of the carrier segments 224. The aft hangers 256 of the blade track segments 226 are engaged with the aft brackets 246 of the retainer segments 223.

The impingement tubes 228 are inserted through opposing circumferential end faces of the carrier segment 224 as suggested in FIG. 10. In some embodiments, the impingement tubes 228 are inserted prior to coupling the blade track segments 226 with the carrier segments 224 and retainer segments 223. In some embodiments, the impingement tubes 228 are inserted after coupling the blade track segments 226 with the carrier segments 224 and retainer segments 223. In the illustrative embodiment, three impingement tubes are used at either end of the carrier segment 224, but more or less impingement tubes may be used. At either end of the carrier segment 224, one impingement tube 228 is positioned between the forward hanger 254 and the runner 252 of the blade track segment 226, another impingement tube 228 is positioned between the forward hanger 254 and the aft hanger 256, and another impingement tube 228 is positioned between the aft hanger 256 and the runner 252 as suggested in FIG. 11. The impingement tubes 228 are configured to direct a flow of cooling air toward a backside 253 the blade track segment 226 through impingement holes 248.

The blade track segments 226 are illustratively formed from ceramic-containing materials as suggested in FIG. 11. In some embodiments, the blade track segments 226 are formed from ceramic-matrix composite materials. The carrier segments 224, retainer segments 223, and impingement tubes 228 are illustratively formed from metallic materials.

In some turbine shrouds, air is plumbed through cross drillings in a carrier member, through metering orifices, and impinged on a backside of a blade track segment, sometimes called a seal segment. Such designs can require additional bosses in the carrier casting and drilled holes, including tightly toleranced metering orifices typically used to meter the flow as well as to impinge the flow on the backside of the seal segment. These cooling system features can add cost and complexity to an already complex component.

In illustrative embodiments, impingement tubes 28 are used which channel air from a forward or aft face of a seal segment carrier 24 through orifice holes 48 to impinge on the backface 53 of the seal segment 26. The seal segment 26 may be made from ceramic-matric composite (CMC) materials. The design simplifies the complex carrier component by separating out backside cooling features into a simple, low cost component assembled into the carrier. Impingement tubes 28, 128 could be a simple, low cost, effective means for accomplishing this end.

In illustrative embodiments, by separating these cooling system features out of the carrier component design, the cost and complexity of that component can be improved while the impingement tube component being added can be a very simple, low cost part. The net result of simplifying parts and separating functional features into separate components may result in an overall cost savings while still effectively meeting the basic cooling requirements.

In illustrative embodiments, this impingement tube 28 design would apply to seal segments 26 with generally axial mounting features 54, such as pinned designs. This arrangement could also enable cooling in certain designs which may otherwise struggle due to lack of clearance between axial features. The impingement tube concept would allow the seal segment 26 to be assembled to the carrier 24 and then the impingement tube 28 could be put in place. In some embodiments, without the separate impingement tube (if the tubes were integral with the carrier) the seal segment could not be assembled.

In illustrative embodiments, backside cooling features are separated into a separate component from the carrier. The impingement tube 28 is oriented in a generally axial direction relative to the centerline (or axis A) of the engine 10. It is assembled from either the front face or from the aft face of the carrier 24 with air entering the tube 28 at an opening 46 in the end located at the assembly face (e.g., if assembled from the aft face, then cooling air enters the aft end of the impingement tube 28).

In illustrative embodiments, cooling air enters one end of the tube 28, passes axially through the tube 28, and exits out a series of holes 48 pointing towards the backface 53 of the seal segment 26. This impinges the air normally onto the backface 53 of the seal segment 26. There is a metering feature which controls how much air flows through the impingement tube for a given pressure differential. In some embodiments, this includes the exit holes 48 directing air towards the back side 53 of the seal segment 26. In some embodiments, this could be a metering orifice 149 located at the inlet 146 to the impingement tube 128. In some embodiments, this could be a metering orifice located upstream of the impingement tube 28, 128 in the cooling air circuit.

In illustrative embodiments, instead of exiting through a series of exit holes 48, the cooling air could exit via an axial slot 148 on the underside of the tube 128. The slot 148 could meter the flow and/or a metering orifice 149 can be formed at the entrance 146 of the impingement tube 128 to meter the flow with less variability. The slot 148 may minimize thermal gradients in the CMC seal segment 26 to minimize thermal stresses. The slot 148 may require a higher cooling air flow than the impingement holes 48 which can increase specific fuel consumption of the engine 10. In some embodiments, the exit holes 48 or slots 148 could be angled relative to the backside surface 53 in order to create a flow pattern within the back side cavity 34 conducive to the desired heat transfer or pressure management. For instance, swirl within the cavity 34 could be created for heat transfer or air could be made to flow across a gap or hole to lower the effective pressure at the entrance to the gap or hole.

In illustrative embodiments, a seal 35 is positioned around the impingement tube 28 at the assembly face. The purpose of this seal 35 is to prevent air from entering the carrier cavity 34 without passing through the impingement tube 28 exit holes 48. This seal 35 could take many forms including a high temperature gasket (such as micaboard), a pressure assisted metal seal (such as a "C" seal), or a ceramic rope seal. A retaining plate 37 may be used to hold the seal 35 against the carrier 24.

In illustrative embodiments, the impingement tube 28 includes a shoulder on the end of the impingement tube 28 for contacting the carrier 24 wall (directly or indirectly) to counteract the higher pressure load within the impingement tube 28 from trying to push the impingement tube 28 into the carrier 24. In some embodiments, the impingement tube 28 could be brazed in place, thereby providing sealing as well as retention. The impingement tube 28 could be brazed directly to the carrier 24 or to a retaining plate which in turn is sealed against the assembly face of the carrier 24. If strength of the braze joint is adequate, the braze joint could provide the resistance to the pressure load trying to force the impingement tube 28 into the carrier 24 (e.g., no shoulder is necessary). This would result in lower cost impingement tubes. By brazing the impingement tubes 28 to a single retaining plate, the shroud assembly 20 could be optimized and failsafed by combining all impingement tubes 28 and retaining hardware into a single component. The result is easier, less time consuming assembly and the elimination of the possibility of forgetting to assemble a separate impingement tube.

In illustrative embodiments, the impingement tubes 28 are cantilevered out from one wall of the carrier 24 and may be susceptible to dynamic response. To protect against this, damping and/or adequate support (limiting deflections/strain) could be provided where the closed end of the tube could fit within a hole 39 in the carrier (or other structural component in that location). The closed end could fit within this pocket 39 with either a tight fit (gap) or with a slight press fit. Alternatively, a mating surface can be manufactured with a very small gap to the impingement tube 28. In this way, any deflection due to dynamic response of the impingement tube 28 would be limited due to the closely fitted mating surface.

In illustrative embodiments, the fore or aft carrier wall creates a pressure bulkhead, across which there is a pressure drop. In some designs, however, this bulkhead could be created by a circumferential flange attached to an adjacent vane, to the case, or to some other intermediate component (between the flowpath components and the outer case). In such cases, the impingement tube would be assembled through the pressure bulkhead wall, regardless of what component this feature resides upon.

In illustrative embodiments, the seal segment 26 is attached to a five sided, cartridge style carrier 24. Attachment pins 56 are assembled through bores in the fore and aft carrier walls and through attachment posts 54 of the seal segment 26. In this manner, the seal segment 26 is held against the perimeter seal 58 of the carrier 24. In some embodiments, a retaining plate, such as cover plate 37, could be bolted against the face of the carrier 24 to retain both the attachment pins 56 and the impingement tubes 28. The retaining plate would be bolted in place with a high temperature gasket, such as gasket 35, between the retaining plate and the carrier wall. As shown, the impingement tubes 28 could be separate pieces assembled into the carrier 24 prior to bolting on the retaining plate and gasket. In some embodiments, the impingement tubes 28 could be an integral part of the retaining plate (or brazed into the retaining plate) such that bolting the retaining plate into the carrier 24 automatically assembles the impingement tubes 28 with the carrier 24. The high temperature gasket would seal around the impingement tubes 28 just as it seals around the attachment pin 56 bores.

According to the present disclosure, a turbine shroud may include a plurality of carrier segments, a plurality of blade track segments, and a plurality of impingement tubes. The carrier segments may comprise metallic material and be arranged circumferentially adjacent to one another around an axis. The blade track segments may comprise ceramic-matrix composite material and be arranged circumferentially adjacent to one another around the axis. Each blade track segment may be coupled to one of the carrier segments.

In illustrative embodiments, each impingement tube may extend into one of the carrier segments and may be configured to direct a flow of cooling air toward a radially-outward facing side of the blade track segment.

In illustrative embodiments, each impingement tube may include an elongated body defining an internal plenum, an opening formed through one end of the elongated body and extending into the internal plenum, and an impingement hole formed through the elongated body and in fluid communication with the internal plenum.

In illustrative embodiments, the impingement hole may be configured to direct the flow of cooling air toward the radially-outward facing side of the blade track segment at an angle relative to the radially-outward facing side such that the flow of cooling air is not normal to the radially-outward facing side.

In illustrative embodiments, the impingement hole may be configured to direct the flow of cooling air toward the radially-outward facing side of the blade track segment such that the flow of cooling air is generally normal to the radially-outward facing side.

In illustrative embodiments, each impingement tube may include an elongated body defining an internal plenum, an opening formed through one end of the elongated body and extending into the internal plenum, and an impingement slot extending along and formed through the elongated body, and the impingement slot is in fluid communication with the internal plenum.

In illustrative embodiments, each impingement tube may include a constriction positioned between the internal plenum and the opening. The constriction may be configured to control the flow of cooling air through the impingement tube.

In illustrative embodiments, each carrier segment may be formed to include a tube receiver configured to receive one of the impingement tubes to hold the impingement tube in place relative to the carrier segment.

In illustrative embodiments, each carrier segment may be formed to include a tube support aligned with and spaced apart from the tube receiver. The tube support may be configured to engage a free end of one of the impingement tubes.

In illustrative embodiments, each impingement tube may extend axially into the carrier segments through the tube receivers.

In illustrative embodiments, each impingement tube may extend circumferentially into the carrier segments through the tube receivers.

In illustrative embodiments, each blade track segment may include a runner and at least two attachment features extending radially outward from the runner. The at least two attachment features may be circumferentially spaced apart from one another and axially extend along the runner.

In illustrative embodiments, each impingement tube may be positioned between the at least two attachment features of a corresponding blade track segment.

In illustrative embodiments, the spacing between the at least two attachment features may be such that the impingement tube blocks removal of the blade track segment when the impingement tube is coupled to the carrier segment.

In illustrative embodiments, each blade track segment may include a runner and at least two attachment features extending radially outward from the runner. The at least two attachment features may be axially spaced apart from one another and circumferentially extend along the runner.

In illustrative embodiments, each impingement tube may be positioned between the at least two attachment features of a corresponding blade track segment.

In illustrative embodiments, each impingement tube may be positioned between one of the at least two attachment features and the runner of a corresponding blade track segment.

According to the present disclosure, a turbine shroud segment for use in a gas turbine engine may include a carrier segment, a blade track segment coupled to the carrier segment, and an impingement tube extending into the internal cavity. The carrier segment may be formed to define an internal cavity. The blade track segment may be coupled to the carrier segment to cover an opening into the internal cavity. The impingement tube may be configured to direct a flow of cooling air toward a side of the blade track segment that faces the internal cavity.

In illustrative embodiments, the blade track segment may include an arcuate runner that extends partway around an axis and at least two attachment posts extending radially outward from the runner into the internal cavity away from the axis. The at least two attachment posts may be circumferentially spaced apart from one another around the axis and axially extend along the axis.

In illustrative embodiments, each impingement tube may extend axially along the axis into the internal cavity between the at least two attachment posts of the blade track segment.

In illustrative embodiments, the impingement tube may include an elongated body defining an internal plenum, an opening formed through one end of the elongated body and extending into the internal plenum, and an impingement hole formed through the elongated body and in fluid communication with the internal plenum.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine engine assembly, the assembly comprising
a carrier component comprising metallic material,
a supported component comprising ceramic-matrix composite material coupled to the carrier component, the supported component including a runner that extends partway around a central axis and at least two attachment features extending radially outward relative to the central axis from the runner, the at least two attachment features axially spaced apart from one another and circumferentially extending along the runner around the central axis, and
a plurality of impingement tubes, each impingement tube extending into the carrier component and configured to direct a flow of cooling air toward a radially-outward facing side of the supported component, each impingement tube positioned between one of the at least two attachment features and the runner of the supported component.

2. The assembly of claim 1, wherein each impingement tube includes an elongated body defining an internal plenum, an opening formed through one end of the elongated body and extending into the internal plenum, and an impingement hole formed through the elongated body and in fluid communication with the internal plenum.

3. The assembly of claim 2, wherein the impingement hole is configured to direct the flow of cooling air toward the radially-outward facing side of the supported component at an angle relative to the radially-outward facing side such that the flow of cooling air is not normal to the radially-outward facing side.

4. The assembly of claim 2, wherein the impingement hole is configured to direct the flow of cooling air toward the radially-outward facing side of the supported component such that the flow of cooling air is generally normal to the radially-outward facing side.

5. The assembly of claim 1, wherein each impingement tube includes an elongated body defining an internal plenum, an opening formed through one end of the elongated body and extending into the internal plenum, and an impingement slot extending along and formed through the elongated body, and the impingement slot is in fluid communication with the internal plenum.

6. The assembly of claim 5, wherein each impingement tube further includes a constriction positioned between the internal plenum and the opening, the constriction configured to control the flow of cooling air through the impingement tube.

7. The assembly of claim 1, wherein the carrier component is formed to include a tube receiver configured to receive one of the impingement tubes included in the plurality of impingement tubes to hold the one of the impingement tubes in place relative to the carrier component.

8. The assembly of claim 7, wherein the carrier component is further formed to include a tube support aligned with and spaced apart from the tube receiver, the tube support configured to engage a free end of one of the impingement tubes included in the plurality of impingement tubes.

9. The assembly of claim 7, wherein each impingement tube extends axially into the carrier component through the tube receivers such that an axis extending through the void of each impingement tube is parallel to the central axis.

10. A turbine engine assembly, the assembly comprising
a carrier component comprising metallic material,
a supported component comprising ceramic-matrix coupled to the carrier component, the supported component including a runner that extends partway around a central axis and at least two attachment features extending radially outward relative to the central axis from the runner, and
an impingement tube extending into the carrier component and configured to direct a flow of cooling air toward a radially-outward facing side of the supported component, wherein the spacing between the at least two attachment features is such that the impingement tube blocks removal of the supported component when the impingement tube is coupled to the carrier component.

11. The assembly of claim 10, wherein the at least two attachment features are circumferentially spaced apart from one another and axially extending along the runner.

12. The assembly of claim 10, wherein the at least two attachment features are provided by spaced apart attachment posts and attachment pins that extend from the attachment posts to engagement with the carrier component to couple the supported component to the carrier component.

13. The assembly of claim 12, wherein the attachment pins extend through the attachment posts.

14. A gas turbine engine assembly, the assembly comprising
a carrier component formed to define an internal cavity,
a supported component coupled to the carrier component including an arcuate runner shaped to extend partway around a central axis, and
an impingement tube extending into the internal cavity, the impingement tube configured to direct a flow of cooling air toward a side of the supported component that faces the internal cavity, the impingement tube arranged to extend axially into the carrier component along the central axis with a tube axis that extends through a void of the impingement tube, the tube axis being parallel to the central axis.

15. The assembly of claim 14, wherein the carrier component is formed to include a tube receiver configured to receive the impingement tube to hold the impingement tube in place relative to the carrier component.

16. The assembly of claim 14, wherein the supported component includes at least two attachment posts extending radially outward from the runner into the internal cavity away from the central axis.

17. The assembly of claim 16, wherein the at least two attachment posts extend along the central axis.

18. The assembly of claim 16, wherein the at least two attachment posts are circumferentially spaced apart from one another around the central axis.

19. The assembly of claim 18, wherein the impingement tube extends axially along the central axis into the internal cavity between the at least two attachment posts of the supported component.

20. The assembly of claim 14, wherein the impingement tube includes an elongated body defining an internal plenum, an opening formed through one end of the elongated body and extending into the internal plenum, and an impingement hole formed through the elongated body and in fluid communication with the internal plenum.

* * * * *